(12) United States Patent
Li et al.

(10) Patent No.: US 12,017,690 B1
(45) Date of Patent: Jun. 25, 2024

(54) DATA-DRIVEN INTEGRAL SLIDING MODE CONTROL METHOD, SYSTEM AND DEVICE FOR HIGH-SPEED ELECTRIC MULTIPLE UNIT

(71) Applicant: East China Jiaotong University, Nanchang (CN)

(72) Inventors: Zhongqi Li, Nanchang (CN); Liang Zhou, Nanchang (CN); Mengying Li, Nanchang (CN); Feng Xu, Nanchang (CN)

(73) Assignee: East China Jiaotong University, Nanchang (CN)

( * ) Notice: Subject to any disclaimer, the term of this patent is extended or adjusted under 35 U.S.C. 154(b) by 0 days.

(21) Appl. No.: 18/539,579

(22) Filed: Dec. 14, 2023

(30) Foreign Application Priority Data

May 25, 2023 (CN) .......................... 202310623739.7

(51) Int. Cl.
*B61L 15/00* (2006.01)
(52) U.S. Cl.
CPC ................................ *B61L 15/0062* (2024.01)
(58) Field of Classification Search
CPC .................................................. B61L 15/0062
See application file for complete search history.

(56) References Cited

FOREIGN PATENT DOCUMENTS

| CN | 112147896 | * | 9/2021 |
| CN | 114077197 | * | 4/2022 |

OTHER PUBLICATIONS

Zhou et al, L. Data-Driven Model-Free Adaptive Sliding Mode Control Based on FFDL for Electric Multiple Units, Google Scholar, Applied Sciences, MDPI, Oct. 2022, pp. 1-20. (Year: 2022).*
Translation of CN 114077197.*
Translation of CN 112147896.*

* cited by examiner

*Primary Examiner* — Russell Frejd
(74) *Attorney, Agent, or Firm* — Brown & Michaels, PC (57) ABSTRACT

A data-driven integral sliding mode control method, system and device for a high-speed electric multiple unit (EMU) is provided, which relates to the field of operation control of EMUs. The method includes performing kinetic analysis on an operation process of a high-speed EMU to enable an input and output data set of the EMU to be equivalent to a multi-input-multi-output (MIMO) discrete-time nonlinear system; constructing an EMU full format dynamic linearization (FFDL) data model involving a generalized disturbance based on the MIMO discrete-time nonlinear system; designing an equivalent control law and a switching control law based on the FFDL data model; and establishing a MIMO EMU integral sliding mode control law, thus controlling the operation of the high-speed EMU. According to the present disclosure, the integral sliding mode control law is deduced based on the FFDL data model to conduct nonlinear control of the EMU.

8 Claims, 1 Drawing Sheet

---

Perform kinetic analysis on an operation process of a high-speed EMU to enable an input and output data set of the EMU to be equivalent to a MIMO discrete-time nonlinear system — 1

Construct an EMU FFDL data model involving a generalized disturbance based on the MIMO discrete-time nonlinear system — 2

Design an equivalent control law and a switching control law based on the FFDL data model involving the generalized disturbance — 3

Establish a MIMO EMU integral sliding mode control law according to the equivalent control law and the switching control law — 4

Control an operation of the high-speed EMU according to the MIMO EMU integral sliding mode control law — 5

DATA-DRIVEN INTEGRAL SLIDING MODE CONTROL METHOD, SYSTEM AND DEVICE FOR HIGH-SPEED ELECTRIC MULTIPLE UNIT

CROSS-REFERENCE TO RELATED APPLICATION

This patent application claims the benefit and priority of Chinese Patent Application No. 202310623739.7 filed with the China National Intellectual Property Administration on May 25, 2023, the disclosure of which is incorporated by reference herein in its entirety as part of the present application.

TECHNICAL FIELD

The present disclosure relates to the technical field of operation control of electric multiple units (EMUs), and in particular to a data-driven integral sliding mode control method, system and device for a high-speed EMU.

BACKGROUND

A high-speed electric multiple unit (EMU) is a power distributed train composed of trailers and electric locomotives, which has become one of the most important means of transportation in people's daily life. However, as the operation speed of the EMU is getting faster and faster, and the operation environment is becoming more and more complicated and changeable, the nonlinear effect among the power units of the EMU is becoming more and more obvious. In this case, the safety and other performance requirements of the EMU cannot be guaranteed only by the manual operation of the EMU driver. Therefore, it is necessary to further develop an EMU automatic driving system to achieve efficient operation of the EMU.

The controller with high reliability and good tracking effect is the core of the EMU automatic driving system, and is the key to satisfy the requirements of safety, punctuality, comfort and parking accuracy of the EMU. For the EMU control problem, many advanced control methods have been proposed by scholars in related fields, which can be divided into model-based control methods and data-driven control methods from the perspective of model.

Most of the model-based control methods are based on the theorem of Newtonian mechanics, and a mechanism model of the EMU is deduced by introducing some assumptions to design the control scheme. This idea is still valid for the single-mass EMU model, but it is more difficult to study the multi-mass EMU which is closer to the actual situation. Like many complex systems, the actual operation process of the EMU has the characteristics of multi-variable, strong coupling and nonlinearity, which makes the establishment of mechanism model extremely complicated.

Aiming at the difficulty of modeling the multi-mass EMU, the data-driven modeling methods have been used in many researches. Firstly, the model structure is established, and the input and output data of each power unit are collected to obtain model parameters through neural network training, cluster analysis, system identification and other methods. Finally, the control scheme is designed for the obtained model. Although the data-driven modeling method can effectively reduce the nonlinear and coupling relationship of the EMU system, but the premise is to obtain the model structure of the EMU (input and output orders and nonlinear terms with great influence). However, due to environmental factors, system internal disturbance, actuator failure and other factors, the input and output data of each power unit are not only numerous but also accidental.

To sum up, mathematical models of the basic resistance coefficient, additional resistance and coupling relationship in EMU model cannot be obtained accurately because of the influence of many uncertain factors. In addition, even if the simplified multi-mass model is established, decoupling must be considered when designing the controller, which undoubtedly increases the computational load and design difficulty.

SUMMARY

For the problems in above background art, the present disclosure provides a data-driven integral sliding mode control method, system and device for a high-speed electric multiple unit (EMU), so as to reduce a computational load in the operation control process of the high-speed EMU and improve control accuracy.

To achieve the above objective, the present disclosure provides the following solution.

In one aspect, the present disclosure provides a data-driven integral sliding mode control method for a high-speed EMU, including:

performing kinetic analysis on an operation process of a high-speed EMU to enable an input and output data set of the EMU to be equivalent to a multi-input-multi-output (MIMO) discrete-time nonlinear system;

constructing an EMU full format dynamic linearization (FFDL) data model involving a generalized disturbance based on the MIMO discrete-time nonlinear system;

designing an equivalent control law and a switching control law based on the FFDL data model involving the generalized disturbance;

establishing a MIMO EMU integral sliding mode control law according to the equivalent control law and the switching control law; and controlling an operation of the high-speed EMU according to the MIMO EMU integral sliding mode control law.

Alternatively, the performing kinetic analysis on an operation process of a high-speed EMU to enable an input and output data set of the EMU to be equivalent to a MIMO discrete-time nonlinear system includes:

performing the kinetic analysis on the operation process of the high-speed EMU to obtain a multi-power unit mathematical model of the EMU;

applying a first-order difference operator to the multi-power unit mathematical model to obtain a discrete-time nonlinear model; and converting each displacement term in the discrete-time nonlinear model into a form related to a speed and a control force, thus enabling the input and output data set of the EMU to be equivalent to the MIMO discrete-time nonlinear system.

Alternatively, the constructing an EMU FFDL data model involving a generalized disturbance based on the MIMO discrete-time nonlinear system includes:

enabling the MIMO discrete-time nonlinear system to be equivalent to the FFDL data model in a case of satisfying a predetermined theorem; and constructing the EMU FFDL data model involving the generalized disturbance based on the FFDL data model.

Alternatively, the establishing a MIMO EMU integral sliding mode control law according to the equivalent control law and the switching control law includes:

establishing the MIMO EMU integral sliding mode control law $\Delta u(t)=\Delta u_{eq}(t)+\Delta u_{sw}(t)$ according to the equivalent control law $\Delta u_{eq}$ and the switching control law $\Delta u_{sw}$.

In another aspect, the present disclosure provides a data-driven integral sliding mode control system for a high-speed EMU, including:

a kinetic analysis module, configured to perform kinetic analysis on an operation process of a high-speed EMU to enable an input and output data set of the EMU to be equivalent to a MIMO discrete-time nonlinear system;

a FFDL data model construction module, configured to construct an EMU FFDL data model involving a generalized disturbance based on the MIMO discrete-time nonlinear system;

a control law design module, configured to design an equivalent control law and a switching control law based on the FFDL data model involving the generalized disturbance;

a sliding mode control law establishing module, configured to establish a MIMO EMU integral sliding mode control law according to the equivalent control law and the switching control law; and an EMU operation control module, configured to control an operation of the high-speed EMU according to the MIMO EMU integral sliding mode control law.

In another aspect, the present disclosure provides an electronic device, including a memory, a processor, and a computer program stored in the memory and executable on the processor. The processor, when executing the computer program, implements the above data-driven integral sliding mode control method.

Alternatively, the memory is a non-transient computer-readable storage medium.

According to specific embodiments provided by the present disclosure, the present disclosure discloses the following technical effects.

According to a data-driven integral sliding mode control method, system and device for a high-speed EMU, the input and output data set of the EMU is enabled to be equivalent to the MIMO discrete-time nonlinear system by performing kinetic analysis on the operation process of the high-speed EMU; an EMU FFDL data model involving a generalized disturbance is constructed based on the MIMO discrete-time nonlinear system; an equivalent control law and a switching control law are designed according to the FFDL data model involving the generalized disturbance; a MIMO EMU integral sliding mode control law is established according to the equivalent control law and the switching control law; the operation of the high-speed EMU is controlled according to the MIMO EMU integral sliding mode control. According to the method provided by the present disclosure, the integral sliding mode control law is deduced based on the FFDL data model to conduct nonlinear control of the high-speed EMU, thus effectively reducing the computational load in the operation control process of the high-speed EMU and improving the control accuracy. A speed error requirement of the EMU can be satisfied, the safe and punctual operation of the EMU can be achieved, the control force changes more smoothly, and the acceleration of each power unit can satisfy a comfort requirement of passengers, thus having a wide application prospect.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of embodiments of the present disclosure is to provide a data-driven integral sliding mode control method, system and device for a high-speed EMU, so as to reduce a computational load in the operation control process of the high-speed EMU and improve control accuracy.

To make the above objective, features and advantages of the present disclosure clearer and more comprehensible, the following further describes the present disclosure in detail with reference to the accompanying drawings and the specific embodiments.

Figure 1:
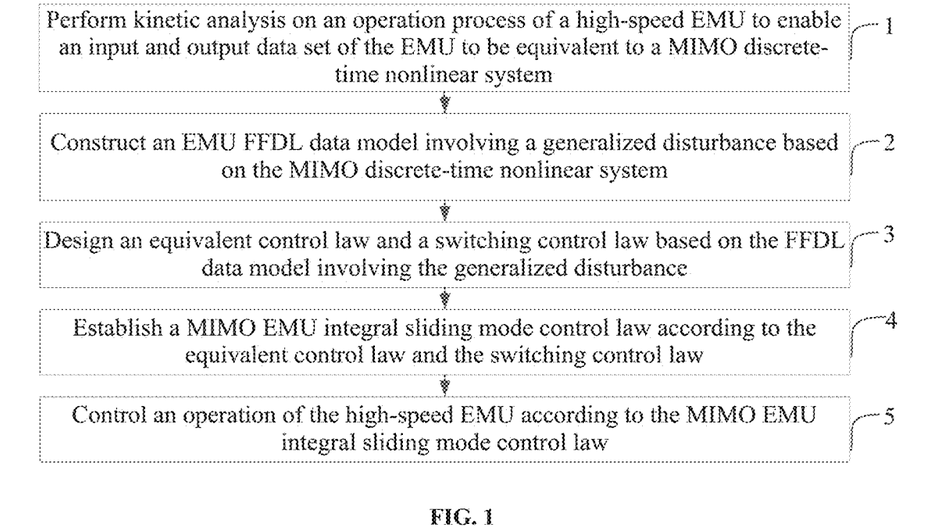
FIG. 1 is a flow chart of a data-driven integral sliding mode control method for a high-speed EMU according to the present disclosure.

FIG. 1 is a flow chart of a data-driven integral sliding mode control method for a high-speed EMU according to the present disclosure. Referring to FIG. 1, the data-driven integral sliding mode control method for the high-speed EMU includes following steps 1-5.

In step 1, kinetic analysis is performed on an operation process of the high-speed EMU to enable an input and output data set of the EMU to be equivalent to a MIMO discrete-time nonlinear system.

Step 1 specifically includes following steps 1.1-1.3.

In step 1.1, the kinetic analysis is performed on the operation process of the high-speed EMU to obtain a multi-power unit mathematical model of the EMU.

Figure 2:
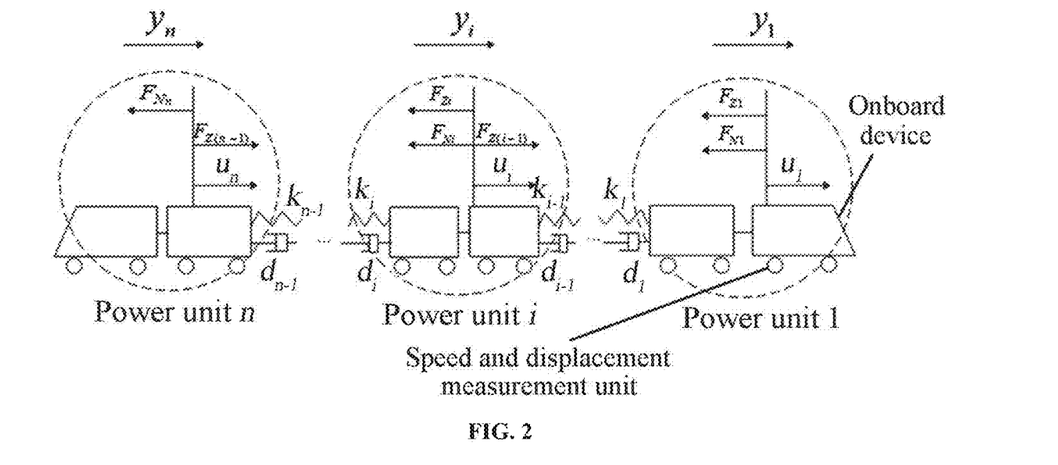
FIG. 2 is a schematic diagram of kinetic analysis of an operation process of a high-speed EMU.

An operation system of the high-speed EMU (hereinafter referred to as EMU) is composed of multiple relatively independent traction power units, and each power unit is composed of multiple power locomotives and trailers in a distributed manner. During the operation of the EMU, each power unit is not only affected by its own control force, but also affected by couplers from adjacent units. The longitudinal kinetic analysis of the EMU is as shown in FIG. 2. In FIG. 2, the middle carriage is a power locomotive equipped with the traction unit, and the first and last carriages are trailers.

The force of EMU is analyzed according to Newton's law of kinematics, and each power unit is subjected to a traction or braking force (collectively referred to as a control force), basic resistance and an inter-unit force. According to the above analysis, the multi-power unit mathematical model of the EMU can be expressed as:

$$\begin{cases} \dfrac{dy_1(t)}{dt} = \varepsilon_1 \cdot \alpha_1 \\ \qquad = \varepsilon_1 \cdot [u_1(t) - F_{N1}(t) - F_{Z1}(t)] \\ \qquad \vdots \\ \dfrac{dy_i(t)}{dt} = \varepsilon_i \cdot \alpha_i \\ \qquad = \varepsilon_i \cdot [u_i(t) - F_{Ni}(t) + F_{Z(i-1)}(t) - F_{Zi}(t)] \\ \qquad \vdots \\ \dfrac{dy_n(t)}{dt} = \varepsilon_n \cdot \alpha_n \\ \qquad = \varepsilon_n \cdot [u_n(t) - F_{Nn}(t) + F_{Z(n-1)}(t)] \end{cases} \quad (1)$$

where, $$F_{Ni}(t) = a_i + b_i y_i(t) + c_i y_i^2(t) \qquad (2),$$

$$F_{Zi}(t) = k_i(x_i(t) - x_{i+1}(t)) + d_i(y_i(t) - y_{i+1}(t)) \qquad (3)$$

In the above multi-power unit mathematical model (1), $u_i(t)$ is a control force (traction or braking force) generated by a power unit i at time t under different working conditions of the EMU; $y_i(t)$ and $x_i(t)$ denote the speed and displacement of the power unit at time t, respectively; $\varepsilon_i$ is an acceleration coefficient, $\alpha_i$ denotes a resultant force of the power unit i; $F_{Ni}(t)$ is the basic resistance of the power unit i at time t during the operation of the EMU; parameters $a_i$, $b_i$, $c_i$ denote basic resistance coefficients, which are highly uncertain; $F_{Zi}(t)$ is an inter-unit force between the power unit i and a power unit i+1 at time t; i=1, 2, ..., n, where n is the number of power units included in the EMU. $k_i$ is an elastic coefficient of an adjacent power unit, and $d_i$ is a damping coefficient of the power unit.

In step 1.2, a first-order difference operator is applied to the multi-power unit mathematical model to obtain a discrete-time nonlinear model.

As can be seen from the basic resistance formula (2), the faster the speed of the EMU, the more obvious the influence of the nonlinear term $c_i y_i^2(t)$ on the system. In the present disclosure, it is considered to apply the first-order difference operator to the multi-power unit mathematical model (1) to obtain the discrete-time nonlinear model:

$$\begin{cases} y_1(t+1) = f_1\{y_1(t), y_2(t), u_1(t), x_1(t), x_2(t)\} \\ \qquad \vdots \\ y_i(t+1) = f_i\{y_{i-1}(t), y_i(t), y_{i+1}(t), u_i(t), x_{i-1}(t), x_i(t), x_{i+1}(t)\} \\ \qquad \vdots \\ y_n(t+1) = f_n\{y_{n-1}(t), y_n(t), u_n(t), x_{n-1}(t), x_n(t)\} \end{cases} \quad (4)$$

where $y_i(t)$ is the speed of the power unit i at time t; $u_i(t)$ is the control force of the power unit i at time t; $x_i(t)$ is the displacement of the power unit i at time t; and $f_i$ is a non-linear function.

In step 1.3, each displacement term in the discrete-time nonlinear model is converted into a form related to the speed and the control force, thus enabling the input and output data set of the EMU to be equivalent to the MIMO discrete-time nonlinear system.

When a conventional scheme is applied to achieve EMU operation control, the first problem is to analyze the characteristics of all power units and establish a nonlinear relationship between the collected data, so as to obtain a reliable and accurate EMU operation model. However, the actual operation of the EMU is easily influenced by the changes of environment and road sections, a mass parameter, a resistance coefficient, a spring coefficient and a damping coefficient in the EMU model are uncertain, and nonlinear terms also exist in the model, making it difficult to obtain an accurate model. For above problems, it is considered to simplify nonlinear parts and coupler function of EMU in some researches, thus obtaining an ideal EMU model. In this case, if the controller is designed using a non-data-driven control method, the coupling relationship among various power units needs to be considered, leading to huge computational load. Therefore, a model-free self-adaptive sliding mode controller is designed according to the present disclosure to track and control the speed of the EMU.

Each displacement term in the discrete-time nonlinear model (4) is converted into a form related to the speed and the control force, thus enabling the input and output data set {y(t), u(t), x(t)} of the EMU to be equivalent to the MIMO discrete-time nonlinear system as follows:

$$y(t+1) = g(y(t), \ldots, y(t-n_y), u(t), \ldots, u(t-n_u)) \qquad (5)$$

where, $u(t)=[u_1(t), \ldots, u_n(t)]^T$ and $y(t)=[y_1(t), \ldots, y_n(t)]^T$ denote an input and an output of the operation system of the EMU at time t, respectively; $u_i(t)$ is the control force of the power unit i at time t, $y_i(t)$ is the speed of the power unit i at time t; $n_u$ and $n_y$ are input and output orders of the operation system of the EMU, respectively; and g(•) is a nonlinear and time-varying function.

In step 2, an EMU FFDL data model involving a generalized disturbance is constructed based on the MIMO discrete-time nonlinear system.

Step 2 specifically includes following steps 2.1-2.2.

In step 2.1, in a case of satisfying a preset theorem, the MIMO discrete-time nonlinear system is equivalent to the FFDL data model.

The input and output data set {y(t), u(t), x(t)} of the EMU is subjected to dynamic linearization. A commonly used Compact Form Dynamic Linearization (CFDL) method only considers a relationship between an output variation of the system at the next time and an input variation at the current time. However, the output of the operation system of the EMU depends not only on a control input at a certain time. Based on the above considerations, when the data is linearized, the influence of the input and output in a sliding time window on the output at the next time can be taken into account, which is a FFDL data processing method. Theoretically, complex dynamics in an original system can be captured well using this method, and the system complexity can be effectively dispersed and reduced through the dynamic linearization method.

$\overline{H}(t)$ is defined as a system matrix composed of control inputs and outputs within a certain time, as follows:

$$\overline{H}(t) = [\Delta y^T(t), \ldots, \Delta y^T(t-L_y+1), \Delta u^T(t), \ldots, \Delta u^T(t-L_u+1)]^T \qquad (6)$$

where $0 \leq L_u \leq n_u$ and $0 \leq L_y \leq n_y$ are length constants of linearization of system input and control output, respectively, also called pseudo-order. $\Delta y(t)=y(t)-y(t-1)$ is an output variation at time t; $\Delta u(t)=u(t)-u(t-1)$ is an input variation at time t. It should be noted that the method provided by the present disclosure is aimed at a multi-input-multi-output system, so a bold parameter is the total amount of the system, and a non-bold parameter is the amount of a certain power unit.

The following two assumptions are made for the MIMO discrete-time nonlinear system (5).

Assumption 1: Partial derivatives of the nonlinear time-varying function g(•) for all components of the system are continuous.

Assumption 2: The system satisfies a generalized Lipschitz condition, that is, for any time $t_1 \neq t_2 \geq 0$ and $\overline{H}(t_1) \neq \overline{H}(t_2)$:

$$\|y(t_{1+1}) - y(t_{2+1})\| \leq b \|H(t_1) - H(t_2)\| \quad (7)$$

where b is a constant greater than 0, and $\Delta \overline{H}(t) = \overline{H}(i) - \overline{H}(t-1)$.

Theorem 1: If the MIMO discrete-time nonlinear system (5) satisfies the assumption 1 and assumption 2, when $\|\Delta \overline{H}(t)\| \neq 0$, there must be a pseudo-block Jacobian matrix $\Phi(t) \in R^{n_{Ly}+n_{Lu}}$, making the system equivalent to a FFDL data model:

$$y(t+1) = y(t) + \Phi(t) \Delta \overline{H}(t) \quad (8)$$

At any time t, a time-varying parameter matrix $\Phi(t) = [\Phi_1(t), \ldots, \Phi_{L_y+L_u}(t)]$ is bounded, where $\Phi_i(t)$ is a corresponding submatrix.

Theorem 1 has been strictly proved that different FFDL data models can be obtained by choosing different linearization length constants L (including $L_y$ and $L_u$), and reasonable choose of time-varying parameter vectors $\Phi(t)$ and L can improve the flexibility of the data model in describing the original system. For the ease of description, $L_y = L_u = 1$, and other cases are similar.

In step 2.2, an EMU FFDL data model involving a generalized disturbance is constructed based on the FFDL data model.

Considering uncertain factors such as unknown external disturbance and parameter estimation error in the operation process of the EMU, the input and output data set $\{y(t), u(t), x(t)\}$ of the EMU is rewrote as follows:

$$y_m(t+1) = g(y(t), \ldots, y(t-n_y), u(t), \ldots, u(t-n_u)) + d(t) \quad (9)$$

where $y_m(t) = [y_{m1}(t), \ldots, y_{mn}(t)]^T$ is an output of the system at time t under the external influence; $d(t) = [d_1(t), \ldots, d_n(t)]^T$ is a bounded generalized disturbance including uncertain terms such as unknown external disturbance and parameter estimation error.

Equation (5) is substituted into Equation (9) to obtain:

$$y_m(t+1) = y(t+1) + d(t) \quad (10)$$

According to Equations (8) and (10), the EMU FFDL data model involving the generalized disturbance can be obtained:

$$\Delta y_m(t+1) = \Phi_1(t) \Delta y(t) + \Phi_2(t) \Delta u(t) + \Delta d(y) \quad (11)$$

where $\Delta y_m(t+1) = y_m(t+1) - y_m(t)$, and $\Delta d(t) = d(t) - d(t-1)$.

In step 3, an equivalent control law and a switching control law are designed based on the FFDL data model involving the generalized disturbance.

Specifically, a disturbance term in the FFDL data model involving the generalized disturbance is estimated by a value of its one-step delay, and a parameter estimation criterion function is introduced.

Since d(t) in the EMU FFDL data model (11) involving the generalized disturbance is unknown, a disturbance term $\Delta d(t)$ in Equation (11) is estimated through a value of its one-step delay based on a disturbance estimation technique:

$$\Delta \hat{d}(t) = \Delta d(t-1) = \Delta y_m(t) - \Phi(t-1) \Delta y(t-1) - \Phi_2(t-1) \Delta u(t-1) \quad (12)$$

where $\hat{d}(t)$ is an estimated value of the bounded generalized disturbance d(t); $\Delta \hat{d}(t) = \hat{d}(t) - \hat{d}(t-1)$.

Next, the time-varying parameter vector $\Phi(t)$ needs to be estimated in real time, and the parameter estimation criterion function is introduced:

$$J(\Phi(t)) = \|\Delta y_m(t) - \Delta \hat{d}(t) - \Phi(t-1) \Delta \overline{H}(t-1)\|^2 + \mu \|\Phi(t) - \hat{\Phi}(t)\|^2 \quad (13)$$

where $\mu > 0$ is a change rate for constraining adjacent parameters; J is an indicator function symbol; $\hat{\Phi}(t) = [\hat{\Phi}_1(t), \hat{\Phi}_2(t)]$ is an estimated value of $\Phi(t) = [\Phi_1(t), \Phi_2(t)]$. $\Phi(t) = [\Phi_1(t), \Phi_2(t)]$ is replaced with $\hat{\Phi}(t) = [\hat{\Phi}_1(t), \hat{\Phi}_2(t)]$ below.

The parameter estimation criterion function (13) is minimized to obtain the following parameter estimation algorithm:

$$\hat{\Phi}(t) = \hat{\Phi}(t-1) + \frac{\beta(\Delta y_m(t) - \Delta \hat{d}(t) - \hat{\Phi}(t-1) \Delta \overline{H}(t-1)) \Delta \overline{H}^T(t-1)}{\mu + \|\Delta \overline{H}(t-1)\|^2} \quad (14)$$

where $\beta \in (0,2]$ is a step length factor. Values of $\Phi_1(t)$ and $\Phi_2(t)$ in Equation (11) can be obtained using the parameter estimation algorithm (14).

Further, a system output error is defined as:

$$e(t) = y_m(t) - y_r(t) \quad (15)$$

where $y_r(t)$ is an expected output of the system at time t.

According to the present disclosure, it is considered to introduce a new integral sliding mode function as follows:

$$s(t) = e(t) + l_1 E(t-1) + b l_2 F(t-1) \quad (16)$$

where $0 < l_1 < 1$; $0 \leq l_2 < 1$; and s(t) is a sliding mode function. Two integral output tracking error terms E(t) and F(t) are defined as follows:

$$E(t) = \sum_{i=0}^{t} e(i) = E(t-1) + e(t) \quad (17)$$

$$F(t) = \sum_{i=0}^{t} \text{sig}^\alpha e(i) = F(t-1) + \text{sig}^\alpha e(t) \quad (18)$$

where a parameter $\alpha$ is a constant greater than 0; $\text{sig}^\alpha e(t) = [\text{sgn}(e_1)|e_1|^\alpha, \ldots, \text{sgn}(e_n)|e_n|^\alpha]^T$, sgn being a symbol function; and $e(t) = [e_1, e_2, \ldots, e_n]^T$, n being the number of power units included in the EMU.

Subsequently, a sliding mode control strategy is designed based on the following reaching law and an integral sliding mode function (16):

$$\Delta s(t+1) = s(t+1) - s(t) = 0 \quad (19)$$

By combining Equations (15), (16) and (19), it is not difficult to obtain:

$$s(t) = s(t+1) \quad (20)$$
$$= e(t+1) + l_1 E(t) + l_2 F(t)$$
$$= y_m(t+1) - y_r(t+1) + l_1 E(t) + l_2 F(t)$$

The data model (11) is substituted into Equation (20) to obtain:

$$s(t) = y_m(t) + \hat{\Phi}_1(t) \Delta y(t) + \hat{\Phi}_2(t) \Delta u(t) + \Delta \hat{d}(t) - y_r(t+1) + l_1 E(t) + l_2 F(t) \quad (21)$$

The equivalent control law expression can be deduced from Equation (21):

$$\Delta u_{eq}(t) = \hat{\Phi}_2^{-1}(t)(s(t) - l_1 E(t) - l_2 F(t) - \Delta \hat{d}(t) + y_r(t+1) - y_m(t) - \hat{\Phi}_1(t) \Delta y(t)) \quad (22)$$

When an initial state of the system is not on a sliding mode surface or an external disturbance occurs during operation, an independent equivalent control cannot drive a trajectory of the system to the sliding mode surface. To mitigate chattering phenomenon of the sliding mode and improve the robustness of the system, the following switching control law is designed based on a parameter estimation algorithm (14) and an integral sliding mode function (16):

$$\Delta u_{sw}(t) = -\hat{\Phi}_2^{-1}(t)\beta \text{sgn}(s(t)) \quad (23)$$

where sgn is a symbol function, and $0<\gamma<\beta$ denotes a switching gain.

In step 4, a MIMO EMU integral sliding mode control law is established according to the equivalent control law and the switching control law.

The MIMO EMU integral sliding mode control law is established according to the equivalent control law (22) and the switching control law (23) as follows:

$$\Delta u(t) = \Delta u_{eq}(t) + \Delta u_{sw}(t) \quad (24)$$

In step 5, an operation of the high-speed EMU is controlled according to the MIMO EMU integral sliding mode control law.

According to the method of the present disclosure, a new data-driven integral sliding mode control (ISMC) method, which is called a FFDL-ISMC method in the present disclosure, is proposed for the first time for an EMU MIMO system with external disturbance. A new ISMC control law (24) is constructed through the FFDL-ISMC method proposed by the present disclosure based on the FFDL data-driven model which is more in line with operation characteristics of the EMU. The technical effects of the method of the present disclosure are mainly embodied in the following four aspects:

(1) A new MIMO discrete ISMC algorithm is proposed. Compared with a traditional sliding mode control method, the chattering phenomenon of the system is alleviated. A relatively efficient nonlinear control is achieved by estimating multiple parameter errors, disturbances and uncertain factors of the EMU system through one-step delay, and the problems of random selection of initial weights of traditional neural network parameters, and multiple control parameters and a large computational load are solved.

(2) In order to improve the control accuracy, an integral sliding mode control scheme is deduced based on the FFDL data model. Compared with the existing combined algorithm, the method provided by the present disclosure, which is a data-driven control algorithm, does not depend on a kinetics model of the EMU.

(3) Compared with a CFDL data model, the FFDL data model adopted by the present disclosure comprehensively considers a relationship between an output variation at the next time and the input and output in a sliding time window with a fixed length. Although the dimension of the FFDL data model is increased, the dynamic behavior of each component becomes simpler, the design and selection of the parameter estimation algorithm are easier, and insensitive to time-varying structure and parameters of the system.

(4) Compared with an existing method of applying a dynamic linearization technology to the EMU, a controlled object of the present disclosure is a multi-power unit EMU, which is more in line with the actual operation requirements. The method provided by the present disclosure enriches the operation control theory of the EMU, and can be extended to other types of EMU systems, i.e., CRH380AL with fourteen locomotives and two trailers, CRH380B with four locomotives and four trailers, three-to-five marshalling TR08 maglev EMU, and the like, thus achieving a wide application prospect.

A FFDL-ISMC method proposed by the present disclosure is simulated and tested using a CRH380A EMU simulation test bench equipped by a laboratory. The corresponding MIMO EMU integral sliding mode control law (24) is input through a programming interface reserved on the simulation test bench, thus displaying an operation effect of the EMU on a virtual visual device in real time. Meanwhile, the information such as an operation speed, location and the distance from a target point of the EMU can be recorded to simulate the real operation environment.

During the operation, white noise is introduced to simulate the external interference encountered by the EMU in the actual operation to verify the robustness of the proposed FFDL-ISMC method. The integral sliding mode control law (24) and vehicle information are input into the simulation test bench, and the operation speed, position, control force and other information of the EMU obtained from various methods are recorded and compared with those obtained from the traditional MFAC (Model-Free Adaptive Control) method.

The speed tracking and error comparison experiments show that the control performances of the FFDL-ISMC method of present disclosure and the traditional MFAC method are greatly affected due to the external disturbance. In the smooth road section, the tracking error range of each power unit of the MFAC method ranges from [−0.408 km/h, 0.413 km/h]. However, when passing through the road section where the expected speed changes frequently, the tracking performance of the MFAC method deteriorates further, and the error can only be stabilized between [−1.051 km/h and 0.962 km/h]. In contrast, the FFDL-ISMC method provided by the present disclosure adopts a novel integral sliding mode control law (24) to ensure convergence, thus the tracking error range of each power unit is stable between [−0.121 km/h and 0.132 km/h] throughout the whole process, which is less affected by disturbance and meets the requirements of speed tracking accuracy.

The control force and acceleration comparison experiment shows that during starting, braking and inertia, the unit control force given by each power unit according to the control law scheme of the FFDL-ISMC method of present disclosure satisfies the requirements of constant traction force starting and constant power operation, and the traction/braking force ranges from [−52 kN to 42 kN]. In a working condition transition stage, the control force can also change slowly at a certain rate. However, in the MFAC method, due to the existence of large control force change during starting and braking, the traction/braking force ranges from [−55 kN to 47 kN], and the control force in the MFAC method changes frequently and has a large amplitude, which also brings some safety problems to the operation of the EMU without energy saving. In addition, the acceleration in the MFAC method changes too fast, ranging from [−0.9749 m/s² to 0.8687 m/s²], and the amplitude is large. However, the acceleration transition of the high-speed EMU using the FFDL-ISMC method of the present disclosure changes gently, except for the starting stage, the range is from [−0.9249 m/s² to 0.8187 m/s²], the amplitude is smaller than that in the MFAC method, and the comfort requirement of passengers is satisfied.

Furthermore, in order to analyze the control performance of each controller algorithm more intuitively, the following performance indicators are considered to evaluate the controller.

(1) Mean Squared Error (MSE)

$$MSE = \frac{1}{nT}\sum_{i=1}^{n}\sum_{t=1}^{T}|e_i(t)|^2 \tag{25}$$

(2) Integrated Absolute Error (IAE)

$$IAE = \frac{\sum_{i=1}^{n}\int_{0}^{\infty}|e_i(t)|dt}{n} \tag{26}$$

(3) Maximum Acceleration (MA)

$$MA = \sup_{t\in[2,T], i\in[1,n]}|y_i(t) - y_i(t-1)| \tag{27}$$

Calculation modes of the performance indicators MSE, IAE and MA are shown in Equations (25), (26) and (27), respectively, in which i denotes the i-th power unit; n is the number of power units included in the EMU; t and T are the current sampling time and the total time, respectively; e is an output error of the power unit i at time t; and sup denotes the maximum value.

Evaluation results of the performance indicators are shown in Table 1 below.

TABLE 1

Evaluation Results of Performance Indicator

| Method | MSE | IAE | MA |
|---|---|---|---|
| FFDL-ISMC | 0.052 | 324 | 0.9249 |
| MFAC | 0.287 | 1814 | 0.9749 |

MSE indicator is used to measure a deviation between an observed value and a true value, and is sensitive to an abnormal value in the data. The smaller the MSE value, the better the tracking effect of the system. It is the same for the IAE value. The results in Table 1 show that the MSE value and IAE value obtained from the FFDL-ISMC method of the present disclosure are smaller than those obtained from the traditional MFAC method. The maximum acceleration/deceleration MA reflects the stability of the system input. As can be seen from the results in Table 1, the maximum acceleration/deceleration in the EMU using the FFDL-ISMC method of the present disclosure is 0.9249 m/s$^2$, with a small change. However, the maximum acceleration/deceleration in the traditional MFAC method is large, which is 0.9749 m/s$^2$. This means that the traditional MFAC method is not conducive to the comfort requirements of passengers, while the FFDL-ISMC method provided by the present disclosure can satisfy the comfort requirements of passengers. To sum up, the FFDL-ISMC method provided by the present disclosure can control the EMU to operate with small tracking error and stable acceleration/deceleration in the existence of interference.

Based on the method provided by the present disclosure, the present disclosure also provides a data-driven integral sliding mode control system for a high-speed EMU, including a kinetic analysis module, a FFDL data model construction module, a control law design module, a sliding mode control law establishing module, and an EMU operation control module.

The kinetic analysis module is configured to perform kinetic analysis on an operation process of a high-speed EMU to enable an input and output data set of the EMU to be equivalent to a MIMO discrete-time nonlinear system.

The FFDL data model construction module is configured to construct an EMU FFDL data model involving a generalized disturbance based on the MIMO discrete-time nonlinear system.

The control law design module is configured to design an equivalent control law and a switching control law based on the FFDL data model involving the generalized disturbance.

The sliding mode control law establishing module is configured to establish a MIMO EMU integral sliding mode control law according to the equivalent control law and the switching control law.

The EMU operation control module is configured to control an operation of the high-speed EMU according to the MIMO EMU integral sliding mode control law.

Further, the present disclosure also provides an electronic device, which may include a processor, a communication interface, a memory, and a communication bus. The processor, the communication interface and the memory communicate with one another through the communication bus. A computer program in the memory can be called by the processor to execute the data-driven integral sliding mode control method for the high-speed EMU.

In addition, the computer program in the memory can be stored in a non-transient computer readable storage medium when implemented in the form of a software functional unit and sold or used as a separate product. Based on such an understanding, the technical solution of the present disclosure may be embodied in the form of a software product in essence or in part contributing to the prior art or in part of the technical solution. The computer software product is stored in a storage medium and includes multiple instructions for causing a computer device (which may be a personal computer, a server or a network device, etc.) to perform all or part of the steps of the method described in various embodiments of the present disclosure. The aforementioned storage media include various media capable of storing program codes, such as a U disk, a mobile hard disk, a read only memory, a random-access memory, a magnetic disk or an optical disk.

Like many complex systems, the operation process of the EMU has the characteristics of multi-variable, strong coupling and nonlinearity, seriously affecting the performance of a train control system. For an EMU automatic driving system with external disturbance, a novel data-driven integral sliding mode control method for a high-speed EMU is provided. Firstly, a discrete integral sliding mode control law is designed based on the FFDL data model equivalent to the operation process of the EMU. Further, by performing delay estimation on uncertain terms such as unknown disturbances and parameter errors of the FFDL data model, the control performance of the algorithm and the equivalent description degree of the system are further improved. The FFDL-ISMC method provided by the present disclosure is simulated and tested through a CRH380A EMU simulation test bench equipped in the laboratory, and is compared with other methods. The simulation results show that the FFDL-ISMC method provided by the present disclosure has better control performance, the speed tracking error of each power unit of the EMU is within [−0.121 km/h, 0.132 km/h], and the control force and acceleration are within [−52 kN, 42 kN] and [−0.9249 m/s$^2$, 0.8187 m/s$^2$], respectively, and change stably, thus satisfying the comfort requirements of passengers.

Embodiments in this specification are described in a progressive manner, each embodiment focuses on differences from other embodiments, and the same and similar parts between the embodiments can be referred to each other. Since the system disclosed in the embodiments corresponds to the method disclosed by the embodiments, the description thereof is relatively simple, and for relevant matters, references may be made to the description of the method.

In this specification, several specific examples are used for illustration of the principles and implementations of the present disclosure. The description of the foregoing embodiments is merely used to help illustrate the method and its core principles of the present disclosure. In addition, those of ordinary skill in the art can make various modifications in terms of specific embodiments and scope of application in accordance with the ideas of the present disclosure. In conclusion, the content of this specification shall not be construed as a limitation to the present disclosure.

What is claimed is:

1. A data-driven integral sliding mode control method for a high-speed electric multiple unit (EMU), comprising:
performing kinetic analysis on an operation process of a high-speed EMU to enable an input and output data set of the EMU to be equivalent to a multi-input-multi-output (MIMO) discrete-time nonlinear system;
constructing an EMU full format dynamic linearization (FFDL) data model involving a generalized disturbance based on the MIMO discrete-time nonlinear system;
designing an equivalent control law and a switching control law based on the FFDL data model involving the generalized disturbance, which comprises:
estimating a disturbance term $\Delta d(t)$ in the FFDL data model $\Delta y_m(t+1)=\Phi_1(t)\Delta y(t)+\Phi_2(t)\Delta u(t)+\Delta d(t)$ involving the generalized disturbance through a value of its one-step delay based on a disturbance estimation technique:

$$\Delta \hat{d}(t)=\Delta d(t-1)=\Delta y_m(t)-\Phi_1(t-1)\Delta y(t-1)-\Phi_2(t-1)\Delta u(t-1),$$

wherein $\hat{d}(t)$ is an estimated value of a bounded generalized disturbance $d(t)$; $\Delta \hat{d}(t)=\hat{d}(t)-\hat{d}(t-1)$; $\Delta y(t)=y(t)-y(t-1)$ is an output variation at a time t; $\Delta u(t)=u(t)-u(t-1)$ is an input variation at the time t; $\Phi_1(t)$ is a submatrix in a time-varying parameter vector $\Phi(t)$;
estimating the time-varying parameter vector $\Phi(t)$ in real time, and introducing a parameter estimation criterion function:

$$J(\Phi(t))=\|\Delta y_m(t)-\Delta \hat{d}(t)-\Phi(t-1)\Delta \overline{H}(t-1)\|^2+\mu\|\Phi(t)-\hat{\Phi}(t)\|^2,$$

wherein $\mu>0$ is a change rate for constraining adjacent parameters; J is an indicator function symbol; $\hat{\Phi}(t)=[\hat{\Phi}_1(t),\hat{\Phi}_2(t)]$ is an estimated value of $\Phi(t)=[\Phi_1(t),\Phi_2(t)]$; $\Phi(t)=[\Phi_1(t),\Phi_2(t)]$ is replaced with $\hat{\Phi}(t)=[\hat{\Phi}_1(t),\hat{\Phi}_2(t)]$ below; $\overline{H}(t)$ is defined as a system matrix composed of control inputs and outputs within a certain time;
minimizing the parameter estimation criterion function to obtain a following parameter estimation algorithm:

$$\hat{\Phi}(t) = \hat{\Phi}(t-1) + \frac{\beta(\Delta y_m(t) - \Delta \hat{d}(t) - \hat{\Phi}(t-1)\Delta \overline{H}(t-1))\Delta \overline{H}^T(t-1)}{\mu + \|\Delta \overline{H}(t-1)\|^2},$$

wherein $\beta \in (0,2]$ is a step length factor; values of $\Phi_1(t)$ and $\Phi_2(t)$ in the FFDL data model involving the generalized disturbance is obtained using the parameter estimation algorithm;
defining a system output error as:

$$e(t)=y_m(t)-y_r(t),$$

wherein $y_r(t)$ is an expected output of the system at the time t;
introducing a new integral sliding mode function as follows:

$$s(t)=e(t)+l_1E(t-1)+bl_2F(t-1),$$

wherein $0<l_1 \leq 1$, $0<l_2<1$; and $s(t)$ is a sliding mode function; two integral output tracking error terms $E(t)$ and $F(t)$ are defined as follows:

$$E(t) = \sum_{i=0}^{t} e(i) = E(t-1) + e(t)$$

$$F(t) = \sum_{i=0}^{t} \text{sig}^\alpha e(i) = F(t-1) + \text{sig}^\alpha e(t),$$

wherein a parameter $\alpha$ is a constant greater than 0;
$\text{sig}^\alpha e(t)=[\text{sgn}(e_1)|e_1|\alpha, \ldots, \text{sgn}(e_n)|e_n|^\alpha]^T$, sgn being a symbol function; and $e(t)=[e_1, e_2, \ldots, e_n]^T$, n being a number of power units comprised in the EMU;
designing a sliding mode control strategy based on a following reaching law and the integral sliding mode function:

$$\Delta s(t+1)=s(t+1)-s(t)=0;$$

obtaining a following equation by combining $e(t)=y_m(t)-y_r(t)$, $s(t)=e(t)+l_1E(t-1)+bl_2F(t-1)$ and $\Delta s(t+1)=s(t+1)-s(t)=0$;

$$s(t) = s(t+1)$$
$$= e(t+1) + l_1E(t) + l_2F(t)$$
$$= y_m(t+1) - y_r(t+1) + l_1E(t) + l_2F(t);$$

substituting the EMU FFDL data model involving the generalized disturbance into $$s(t) = s(t+1)$$
$$= e(t+1) + l_1E(t) + l_2F(t)$$
$$= y_m(t+1) - y_r(t+1) + l_1E(t) + l_2F(t)$$

to obtain:

$$s(t)=y_m(t)+\hat{\Phi}_1(t)\Delta y(t)+\hat{\Phi}_2(t)\Delta u(t)+\Delta \hat{d}(t)-y_r(t+1)+l_1E(t)+l_2F(t);$$

deducing an expression of the equivalent control law from $$s(t)=y_m(t)+\hat{\Phi}_1(t)\Delta y(t)+\hat{\Phi}_2(t)\Delta u(t)+\Delta \hat{d}(t)-y_r(t+1)+l_1E(t)+l_2F(t);$$

$$\Delta u_{eq}(t)=\hat{\Phi}_2^{-1}(t)(s(t)-l_1E(t)-l_2F(t)-\Delta \hat{d}(t)+y_r(t+1)-y_m(t)-\hat{\Phi}_1(t)\Delta y(t));$$

designing the switching control law based on the parameter estimation algorithm and the integral sliding mode function:

$$\Delta u_{sw}(t) = -\hat{\Phi}_2^{-1}(t)\beta \operatorname{sgn}(s(t));$$

establishing a MIMO EMU integral sliding mode control law according to the equivalent control law and the switching control law, which comprises:
establishing the MIMO EMU integral sliding mode control law $\Delta u(t)=\Delta u_{eq}(t)+\Delta u_{sw}(t)$ according to the equivalent control law $\Delta u_{eq}(t)$ and the switching control law $\Delta u_{sw}(t)$; and
controlling an operation of the high-speed EMU according to the MIMO EMU integral sliding mode control law.

2. The data-driven integral sliding mode control method according to claim 1, wherein the performing kinetic analysis on an operation process of a high-speed EMU to enable an input and output data set of the EMU to be equivalent to a MIMO discrete-time nonlinear system comprises:
performing the kinetic analysis on the operation process of the high-speed EMU to obtain a multi-power unit mathematical model of the EMU;
applying a first-order difference operator to the multi-power unit mathematical model to obtain a discrete-time nonlinear model; and
converting each displacement term in the discrete-time nonlinear model into a form related to a speed and a control force, thus enabling the input and output data set of the EMU to be equivalent to the MIMO discrete-time nonlinear system.

3. The data-driven integral sliding mode control method according to claim 2, wherein the constructing an EMU FFDL data model involving a generalized disturbance based on the MIMO discrete-time nonlinear system comprises:
enabling the MIMO discrete-time nonlinear system to be equivalent to the FFDL data model in a case of satisfying a predetermined theorem; and
constructing the EMU FFDL data model involving the generalized disturbance based on the FFDL data model.

4. An electronic device, comprising a memory, a processor, and a computer program stored in the memory and executable on the processor, wherein the processor, when executing the computer program, implements the data-driven integral sliding mode control method according to claim 1.

5. The electronic device according to claim 4, wherein the memory is a non-transient computer-readable storage medium.

6. The electronic device according to claim 4, wherein the performing kinetic analysis on an operation process of a high-speed EMU to enable an input and output data set of the EMU to be equivalent to a MIMO discrete-time nonlinear system comprises:
performing the kinetic analysis on the operation process of the high-speed EMU to obtain a multi-power unit mathematical model of the EMU;
applying a first-order difference operator to the multi-power unit mathematical model to obtain a discrete-time nonlinear model; and
converting each displacement term in the discrete-time nonlinear model into a form related to a speed and a control force, thus enabling the input and output data set of the EMU to be equivalent to the MIMO discrete-time nonlinear system.

7. The electronic device according to claim 6, wherein the constructing an EMU FFDL data model involving a generalized disturbance based on the MIMO discrete-time nonlinear system comprises:
enabling the MIMO discrete-time nonlinear system to be equivalent to the FFDL data model in a case of satisfying a predetermined theorem; and
constructing the EMU FFDL data model involving the generalized disturbance based on the FFDL data model.

8. A data-driven integral sliding mode control system for a high-speed electric multiple unit (EMU), comprising:
a kinetic analysis module, configured to perform kinetic analysis on an operation process of a high-speed EMU to enable an input and output data set of the EMU to be equivalent to a multi-input-multi-output (MIMO) discrete-time nonlinear system;
a full format dynamic linearization (FFDL) data model construction module, configured to construct an EMU FFDL data model involving a generalized disturbance based on the MIMO discrete-time nonlinear system;
a control law design module, configured to design an equivalent control law and a switching control law based on the FFDL data model involving the generalized disturbance, wherein designing the equivalent control law and the switching control law based on the FFDL data model involving the generalized disturbance comprises:
estimating a disturbance term $\Delta d(t)$ in the FFDL data model $\Delta y_m(t+1)=\Phi_1(t)\Delta y(t)+\Phi_2(t)\Delta u(t)+\Delta d(t)$ involving the generalized disturbance through a value of its one-step delay based on a disturbance estimation technique:

$$\Delta \hat{d}(t)=\Delta d(t-1)=\Delta y_m(t)-\Phi_1(t-1)\Delta y(t-1)-\Phi_2(t-1)\Delta u(t-1),$$

wherein $\hat{d}(t)$ is an estimated value of a bounded generalized disturbance $d(t)$; $\Delta\hat{d}(t)=\hat{d}(t)-\hat{d}(t-1)$; $\Delta y(t)=y(t)-y(t-1)$ is an output variation at a time t; $\Delta u(t)=u(t)-u(t-1)$ is an input variation at the time t; $\Phi_1(t)$ is a submatrix in a time-varying parameter vector $\Phi(t)$;
estimating the time-varying parameter vector $\Phi(t)$ in real time, and introducing a parameter estimation criterion function:

$$J(\Phi(t))=\|\Delta y_m(t)-\Delta\hat{d}(t)-\Phi(t-1)\Delta \overline{H}(t-1)\|^2+\mu\|\Phi(t)-\hat{\Phi}(t)\|^2,$$

wherein $\mu>0$ is a change rate for constraining adjacent parameters; J is an indicator function symbol; $\hat{\Phi}(t)=[\hat{\Phi}_1(t),\hat{\Phi}_2(t)]$ is an estimated value of $\Phi(t)=[\Phi_1(t),\Phi_2(t)]$; $\Phi(t)=[\Phi_1(t),\Phi_2(t)]$ is replaced with $\hat{\Phi}(t)=[\hat{\Phi}_1(t),\hat{\Phi}_2(t)]$ below; $\overline{H}(t)$ is defined as a system matrix composed of control inputs and outputs within a certain time;
minimizing the parameter estimation criterion function to obtain a following parameter estimation algorithm:

$$\hat{\Phi}(t)=\hat{\Phi}(t-1)+\frac{\beta(\Delta y_m(t)-\Delta\hat{d}(t)-\hat{\Phi}(t-1)\Delta\overline{H}(t-1))\Delta\overline{H}^T(t-1)}{\mu+\|\Delta\overline{H}(t-1)\|^2},$$

wherein $\beta\in(0,2]$ is a step length factor; values of $\Phi_1(t)$ and $\Phi_2(t)$ in the FFDL data model involving the generalized disturbance is obtained using the parameter estimation algorithm;
defining a system output error as:

$$e(t)=y_m(t)-y_r(t),$$

wherein $y_r(t)$ is an expected output of the system at the time t;

introducing a new integral sliding mode function as follows:

$$s(t)=e(t)+l_1 E(t-1)+bl_2 F(t-1),$$

wherein $0<l_1<1$, $0<l_2<1$; and $s(t)$ is a sliding mode function; two integral output tracking error terms $E(t)$ and $F(t)$ are defined as follows:

$$E(t) = \sum_{i=0}^{t} e(i) = E(t-1) + e(t)$$

$$F(t) = \sum_{i=0}^{t} \text{sig}^\alpha e(i) = F(t-1) + \text{sig}^\alpha e(t),$$

wherein a parameter $\alpha$ is a constant greater than 0; $\text{sig}^\alpha e(t)=[\text{sgn}(e_1)|e_1|^\alpha, \ldots, \text{sgn}(e_n)|e_n|^\alpha]^T$, sgn being a symbol function; and $e(t)=[e_1, e_2, \ldots, e_n]^T$, n being a number of power units comprised in the EMU;

designing a sliding mode control strategy based on a following reaching law and the integral sliding mode function:

$$\Delta s(t+1)=s(t+1)-s(t)=0;$$

obtaining a following equation by combining $e(t)=y_m(t)-y_r(t)$, $s(t)=e(t)\pm l_1 E(t-1)+bl_2 F(t-1)$ and $\Delta s(t+1)=s(t-1)-s(t)=0$:

$$s(t) = s(t+1)$$
$$= e(t+1) + l_1 E(t) + l_2 F(t)$$
$$= y_m(t+1) - y_r(t+1) + l_1 E(t) + l_2 F(t);$$

substituting the EMU FFDL data model involving the generalized disturbance into $$s(t) = s(t+1)$$
$$= e(t+1) + l_1 E(t) + l_2 F(t)$$
$$= y_m(t+1) - y_r(t+1) + l_1 E(t) + l_2 F(t)$$

to obtain:

$$s(t)=y_m(t)+\hat{\Phi}_1(t)\Delta y(t)+\hat{\Phi}_2(t)\Delta u(t)+\Delta\hat{d}(t)-y_r(t+1)+l_1 E(t)+l_2 F(t);$$

deducing an expression of the equivalent control law from $$s(t)=y_m(t)+\hat{\Phi}_1(t)\Delta y(t)+\hat{\Phi}_2(t)\Delta u(t)+\Delta\hat{d}(t)-y_r(t+1)+l_1 E(t)+l_2 F(t);$$

$$\Delta u_{eq}(t)=\hat{\Phi}_2^{-1}(t)(s(t)-l_1 E(t)-l_2 F(t)-\Delta\hat{d}(t)+y_r(t+1)-y_m(t)-\hat{\Phi}_1(t)\Delta y(t));$$

designing the switching control law based on the parameter estimation algorithm and the integral sliding mode function:

$$\Delta u_{sw}(t)=-\hat{\Phi}_2^{-1}(t)\beta\text{sgn}(s(t));$$

a sliding mode control law establishing module, configured to establish a MIMO EMU integral sliding mode control law according to the equivalent control law and the switching control law, wherein establishing the MIMO EMU integral sliding mode control law according to the equivalent control law and the switching control law comprises:

establishing the MIMO EMU integral sliding mode control law $\Delta u(t)=\Delta u_{eq}(t)+\Delta u_{sw}(t)$ according to the equivalent control law $\Delta u_{eq}(t)$ and the switching control law $\Delta u_{sw}(t)$; and an EMU operation control module, configured to control an operation of the high-speed EMU according to the MIMO EMU integral sliding mode control law.

\* \* \* \* \*